US008780871B2

(12) United States Patent
Grandhi et al.

(10) Patent No.: US 8,780,871 B2
(45) Date of Patent: Jul. 15, 2014

(54) METHOD AND APPARATUS FOR DISTRIBUTING BEACON INFORMATION

(75) Inventors: Sudheer A. Grandhi, Mamaroneck, NY (US); Arty Chandra, Manhasset Hills, NY (US); Eldad M. Zeira, Huntington, NY (US); Joseph S. Levy, Merrick, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1039 days.

(21) Appl. No.: 11/562,483

(22) Filed: Nov. 22, 2006

(65) Prior Publication Data

US 2007/0167140 A1 Jul. 19, 2007

Related U.S. Application Data

(60) Provisional application No. 60/759,351, filed on Jan. 17, 2006.

(51) Int. Cl.
*H04W 28/06* (2009.01)
(52) U.S. Cl.
USPC ............ 370/338; 370/312; 370/313; 370/328; 370/349; 709/227; 709/228; 709/246
(58) Field of Classification Search
CPC ...... H04W 28/06; H04W 84/12; H04W 24/00
USPC .......... 370/329, 338, 312, 313, 349; 709/227, 709/228, 246
See application file for complete search history.

(56) References Cited

U.S. PATENT DOCUMENTS

| 5,881,055 | A  | * | 3/1999  | Kondo ............................ 370/311 |
| 6,469,991 | B1 | * | 10/2002 | Chuah ............................ 370/329 |
| 6,675,012 | B2 |   | 1/2004  | Gray |
| 7,277,932 | B2 |   | 10/2007 | Adachi et al. |
| 7,657,276 | B2 |   | 2/2010  | Sakoda |

(Continued)

FOREIGN PATENT DOCUMENTS

| EP | 1515471 | 3/2005 |
| EP | 1657875 | 5/2006 |

(Continued)

OTHER PUBLICATIONS

IEEE 802 Committee, IEEE P802.11r™ / D1.0, Nov. 2005 (Draft Amendment to IEEE Std 802.11™, 2005 (based on 802.1ma D4.0), 802.11e™-2005, 802.11k-D3.0), Draft Amendment to Standard for Information Technology—Telecommunications and information exchange between systems—LAN/MAN—Specific Requirements. Part 11: Wireless Medium Access Control (MAC) and Physical Layer (PHY) Specifications, Amendment 2: Fast BBS Transition, (2005 IEEE Computer Society, IEEE 802 Committee).

(Continued)

*Primary Examiner* — Allahyar Kasraian
(74) *Attorney, Agent, or Firm* — Volpe and Koenig, P.C.

(57) ABSTRACT

A method and apparatus are described for distributing beacon information. A first WTRU modifies a physical layer protocol data unit (PHY PDU) frame to include beacon information. The first WTRU transmits the modified PHY PDU frame to a second WTRU. The second WTRU receives the modified PHY PDU frame and extracts beacon information from the modified PHY PDU frame. The second WTRU associates with the first WTRU.

15 Claims, 4 Drawing Sheets

(56) References Cited

U.S. PATENT DOCUMENTS

| | | | | |
|---|---|---|---|---|
| 8,140,075 | B2* | 3/2012 | Watanabe | 455/436 |
| 8,300,611 | B2* | 10/2012 | Nandagopalan | 370/338 |
| 2004/0008661 | A1* | 1/2004 | Myles et al. | 370/350 |
| 2004/0196919 | A1 | 10/2004 | Mehta et al. | |
| 2004/0246983 | A1 | 12/2004 | Kaatz | |
| 2005/0169292 | A1 | 8/2005 | Young | |
| 2005/0226270 | A1* | 10/2005 | Liu et al. | 370/469 |
| 2005/0249244 | A1* | 11/2005 | McNamara et al. | 370/474 |
| 2006/0140172 | A1* | 6/2006 | Trainin | 370/352 |
| 2006/0227801 | A1* | 10/2006 | Nanda et al. | 370/447 |
| 2007/0047538 | A1* | 3/2007 | Rosner et al. | 370/379 |
| 2007/0054690 | A1* | 3/2007 | Wu et al. | 455/522 |
| 2007/0147284 | A1* | 6/2007 | Sammour et al. | 370/328 |
| 2010/0142493 | A1* | 6/2010 | Sakoda et al. | 370/336 |
| 2011/0299516 | A1* | 12/2011 | Kwon | 370/338 |

FOREIGN PATENT DOCUMENTS

| | | |
|---|---|---|
| WO | 2005/020531 | 3/2005 |
| WO | 2005/022775 | 3/2005 |
| WO | 2005020531 | 3/2005 |
| WO | 2005/046267 | 5/2005 |
| WO | 2005/099195 | 10/2005 |

OTHER PUBLICATIONS

IEEE 802.11 Working Group of the 802 Committee, IEEE P802.11n™/D1.04, Draft Amendment to Standard for Information Technology—Telecommunications and information exchange between systems—Local and metropolitan area networks—Specific Requirements. Part 11: Wireless LAN Medium Access Control (MAC) and Physical Layer (PHY) Specifications: Amendment <number>: Enhancements for Higher Throughput, (IEEE 802.11 Working Group of the 802 Committee, Sep. 2006).
IEEE 802.11 Working Group of the 802 Committee, IEEE P802.11™/D0.01, Draft Amendment to Standard for Information Technology—Telecommunications and information exhange between systems—Local and metropolitan area networks—Specific Requirements. Part 11: Wireless LAN Medium Access Control (MAC) and Physical (PHY) Specifications: Amendment v: Wireless Network Management, (IEEE 802.11 Working Group of the 802 Committee, Jan. 2006).
IEEE 802.11 Working Group of the 802 Committee, IEEE P802.11u™/D0.01, Draft Amendment to Standard for Information Technology—Telecommunication and information exchange between systems—Local and metropolitan area networks—Specific Requirements. Part 11: Wireless LAN Medium Access Control (MAC) and Physical Layer (PHY) Specifications: IEEE 802.11 Interworking With External Networks, (IEEE 802.11 Working Group of the 802 Committee, Sep. 2006).
IEEE LAN/ MAN Standards Committee, ANSI/IEEE Std. 802.11, 1999 Edition (R2003), Information Technology —Telecommunications and information exchange between systems—Local and metropolitan area networks—Specific Requirements. Part 11: Wireless LAN Medium Access Control (MAC) and Physical Layer (PHY) Specifications (Reaffirmed Jun. 12, 2003, IEEE Computer Society, LAN/MAN Standards Committee).
IEEE 802 Committee, IEEE P802.11r™ /D1.0, Nov. 2005 (Draft Amendment to IEEE Std 802.11™, 2005 (based on 802.1ma D4.0), 802.11k-D3.0), Draft Amendment to Standard for Information Technology—Telecommunication and and information exchange between systems—LAN/MAN—Specific Requirements. Part 11: Wireless Medium Access Control (MAC) and Physical Layer (PHY) Specifications, Amendment 2: Fast BSS Transition, (2005 IEEE Computer Society, IEEE 802 Committee).
IEEE 802.11 Working Group of the 802 Committee, IEEE P802.11n™/D1.04, Draft Amendment to Standard for Information Technology—Telecommunication and information exchange between systems—Local and metropolitan area networks—Specific Requirements. Part 11: Wireless LAN Medium Access Control (MAC) and Physical Layer (PHY) Specifications: Amendment <number>: Enhancements for Higher Throughput, (IEEE 802.11 Working Group of the 802 Committee, Sep. 2006).
IEEE 802.11 Working Group of the 802 Committee, IEEE P802.11™/D0.01, Draft Amendment to Standard for Information Technology—Telecommunications and information exhchange between systems—Local and metropolitan area networks—Specific Requirements. Part 11: Wireless LAN Medium Access Control (MAC) and Physical Layer (PHY) Specificaion: Amendment v: Wireless Network Management (IEEE 802.11 Working Group of the 802 Committee, Jan. 2006).
IEEE 802.11 Working Group of the 802 Committee, IEEE P802.11u™/D0.01 Draft Amendment to Standard for Information Technology—Telecommunication and information exchange between systems—Local and metropolitan area networks—Specific Requirements. Part 11: Wireless LAN Medium Access Control (MAC) and Physical Layer (PHY) Specifications: IEEE 802.11 Interworking With External Networks, (IEEE 802.11 Working Group of the 802 Committee, Sep. 2006).
IEEE Computer Society, "Draft IEEE Standard for Local and Metropolitan Area Networks: Media Independent Handover Services," IEEE P802.21™/D00.01, (LAN/MAN Standards Committee, IEEE Computer Society, Jul. 2005).
IEEE LAN/ MAN Standards Committee, ANSI/IEEE Std. 802.11, 1999 Edition (R2003), Information Technology —Telecommunications and information exchange between systems—Local and metropolitan area networks—Specific Requirements. Part 11: Wireless LAN Medium Access Control (MAC) and Physical Layer (PHY) Specifications (Reaffirmed Jun. 12, 2003, IEEE Computer Society, LAN/ MAN Standards Committee).
IEEE LAN/ MAN Standards Committee, IEEE Std. 802.11a-1999 (R2003), (Supplement to IEEE Std. 802.11-1999), Supplement to IEEE Standard for Information Technology—Telecommunications and information exchange between systems—Local and metropolitan area networks—Specific Requirements. Part 11: Wireless LAN Medium Access Control (MAC) and Physical Layer (PHY) Specifications High-speed Physical Layer in the 5 GHz Band, (Reaffirmed Jun. 12, 2003, IEEE—SA Standards Board).
Lee et al., "Performance of an Efficient Method for Association Admission Control in Public Wireless LAN Systems," IEEE Vehicular Technology Conference, pp. 5049-5053 (Sep. 2004).
Ergen, "IEEE 802.1 Tutorial," *IEEE 802.11 Tutorial*, IEEE (Jun. 2002).

* cited by examiner

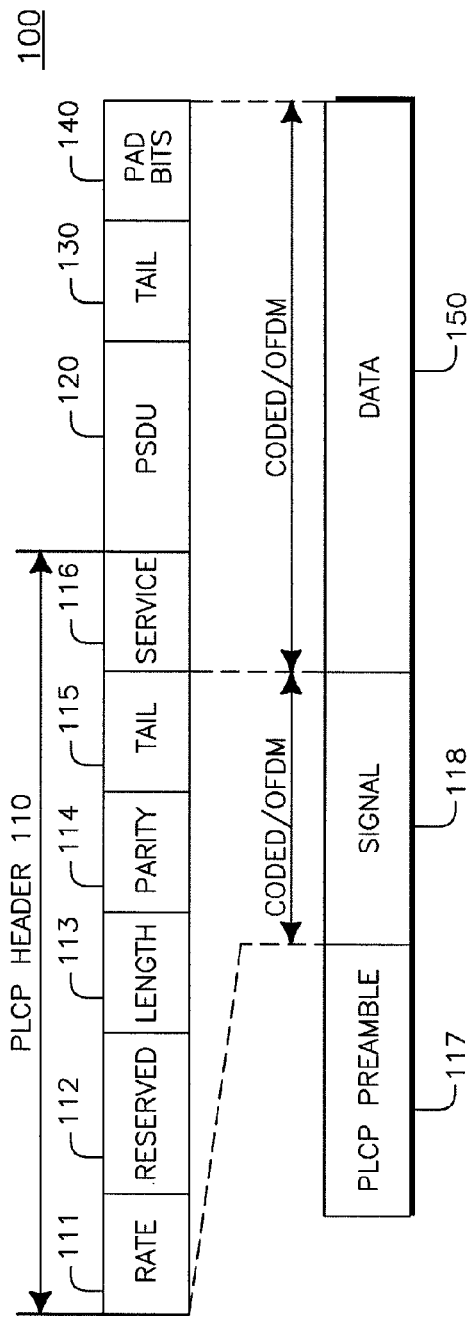
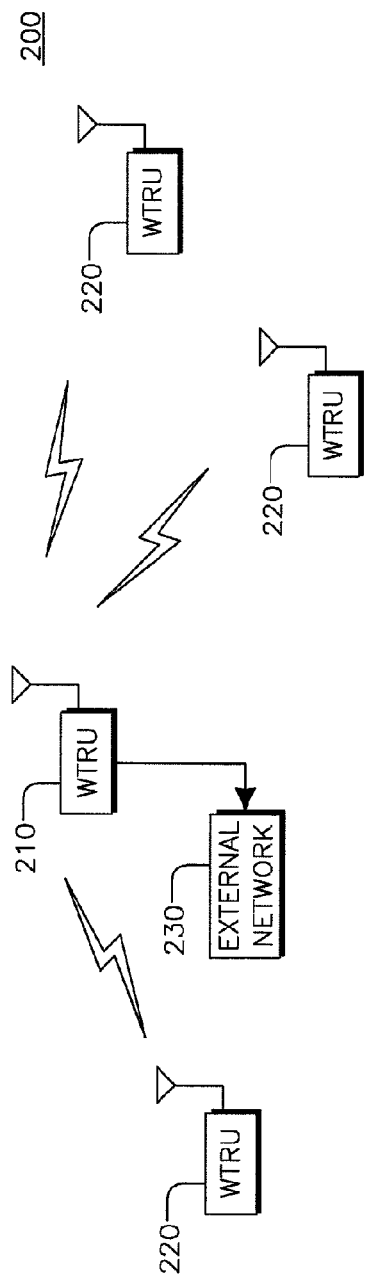
FIG.1 PRIOR ART
FIG.2

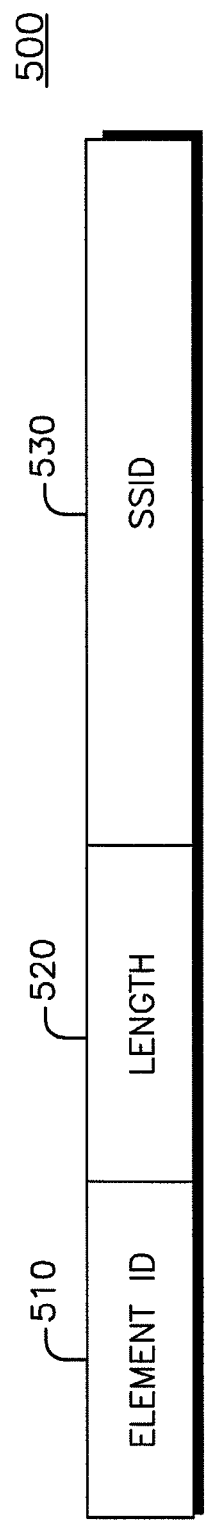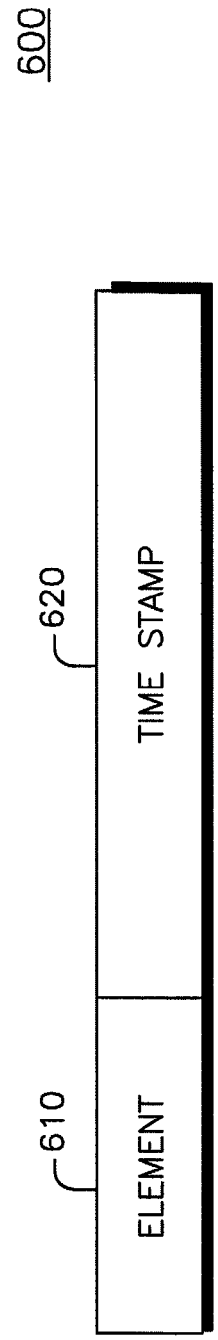

METHOD AND APPARATUS FOR DISTRIBUTING BEACON INFORMATION

CROSS REFERENCE TO RELATED APPLICATIONS

This application claims the benefit of U.S. Provisional Application No. 60/759,351, filed Jan. 17, 2006, which is incorporated by reference herein as if fully set forth.

FIELD OF INVENTION

The present invention relates to wireless communication systems, such as Wireless Local Area Networks (WLANs). In particular, the present invention relates to a method and apparatus of distributing beacon information in a wireless communication system.

BACKGROUND

In 802.11 systems, a station (STA) can associate with an access point (AP) by active or passive scanning. In active scanning, the STA sends a probe request and the AP responds with a probe response. In passive scanning, the STA actively listens for the beacon. Both the probe response packet and the beacon contain similar information, such as Timestamp, Beacon Interval, Service Set Identifier (SSID), Supported Data Rate, Frequency Hopping (FH) parameter, Coordination Function (CF) Parameter, Direct Sequence (DS) parameter set and Capability Information set. In either case, the STA associates with the AP after receiving a beacon or a probe response.

Typically, a mobile STA connects to a new AP by acquiring the beacon information and then associating with it. However, this process may take on the order of several hundred milliseconds, which can be a very long gap for certain applications. Some solutions to this problem propose that the STA should pre-authenticate to more than one AP in a certain area to reduce the time needed for authentication. However, these solutions do not reduce the time required to get beacon information via either a beacon or probe response as a beacon generally has approximately a 100 millisecond periodicity.

Typically, a probe request/response mechanism sends multiple probe request messages and the STA waits for the response from the AP(s). Accordingly, collecting the beacon information itself may take anywhere from tens of milliseconds to 100 milliseconds. This time delay may be detrimental to the functioning of certain applications the STA is running.

Therefore, it would be beneficial to provide a method and apparatus for distributing beacon information to STAs without the limitations of conventional mechanisms.

SUMMARY

The present invention is directed to a method and apparatus for distributing beacon information. A first WTRU modifies a physical layer protocol data unit (PHY PDU) frame to include beacon information. The first WTRU transmits the modified PHY PDU frame to a second WTRU. The second WTRU receives the modified PHY PDU frame and extracts beacon information from the modified PHY PDU frame. The second WTRU associates with the first WTRU.

BRIEF DESCRIPTION OF THE DRAWINGS

The foregoing summary, as well as the following detailed description of the preferred embodiments of the present invention will be better understood when read with reference to the appended drawings, wherein:

FIG. 1 shows a conventional IEEE 802.11a physical layer protocol data unit (PHY PDU) frame;

FIG. 2 shows an exemplary wireless communication system, including a plurality of wireless transmit/receive units (WTRUs), configured in accordance with the present invention;

FIG. 5 is a depiction of a variable information frame, containing variable elements of data in accordance with the present invention; and FIG. 6 is a depiction of a fixed information frame, containing fixed elements of data in accordance with the present invention.

DETAILED DESCRIPTION OF THE PREFERRED EMBODIMENTS

Figure 3:
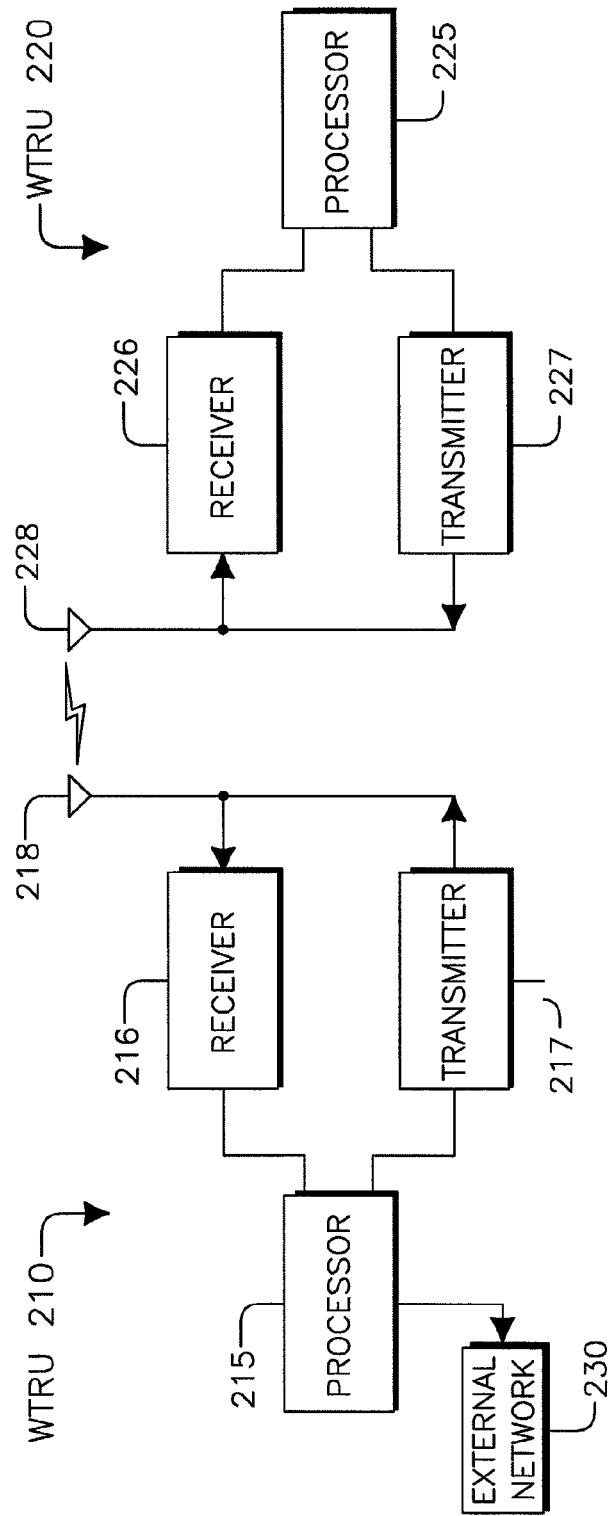
FIG. 3 is a functional block diagram of a pair of WTRUs of the wireless communication system of FIG. 2.

Hereafter, a wireless transmit/receive unit (WTRU) includes but is not limited to a user equipment (UE), a mobile station (STA), a fixed or mobile subscriber unit, a pager, or any other type of device capable of operating in a wireless environment. When referred to hereafter, a base station includes but is not limited to a Node-B, a site controller, an access point (AP), a WTRU, or any other type of interfacing device in a wireless environment.

FIG. 1 shows a conventional IEEE 802.11a PHY PDU frame 100. The PHY PDU frame 100 includes a physical layer convergence protocol (PLCP) preamble field 117, a signal field 118, and a data field 150. The signal field 118 includes a rate field 111, a reserved field 112, a length field 113, a parity field 114, and a tail field 115. The data field 150 includes a service field 116, a physical layer service data unit (PSDU) field 120, a tail field 130, and a pad bits field 140. The rate field 111, reserved field 112, length field 113, parity field 114, tail field 115 and service field 116 comprise a PLCP header 110. The signal field 118 and the data field 150 are coded/orthogonal frequency division multiplexing (OFDM) fields. Generally, the signal field 118 provides information, such as rate, length, and parity, about the format of the data field that follows.

Although embodiments of the present invention will be described in greater detail below, the present invention, in general, relates to a method and apparatus for distributing beacon information by adding additional fields to the PLCP header that will identify the beacon information element and the information itself.

FIG. 2 shows an exemplary wireless communication system 200, including a WTRU 210 and a plurality of WTRUs 220, configured in accordance with the present invention. The WTRUs 220, in a preferred embodiment of the present invention are in wireless communication with the WTRU 210, however, it should be noted that any of the WTRUs 220 may be in wireless communication with one another as well. Additionally, the WTRU 210 may be connected to an external network 230 such as the Internet, a public switched telephone network (PSTN), and the like. In a preferred embodiment of the present invention, the WTRU 210 may be an AP. The WTRU 210 and the WTRU 220 may also be substantially similar to one another.

FIG. 3 is a functional block diagram of a WTRU 210 and a WTRU 220 of the wireless communication system 200 of FIG. 2. As shown in FIG. 2, the WTRU 210 and the WTRU 220 are in wireless communication with one another, and are configured to transmit and receive beacon information in accordance with the present invention. It should be understood that any type of wireless devices may be used to perform the method of transmitting and receiving beacon information.

In addition to the components that may be found in a typical WTRU, the WTRU 210 includes a processor 215, a receiver 216, a transmitter 217, and an antenna 218. The processor 215 is configured to distribute beacon information in accordance with the present invention. The receiver 216 and the transmitter 217 are in communication with the processor 215. The antenna 418 is in communication with both the receiver 216 and the transmitter 217 to facilitate the transmission and reception of wireless data. Additionally, the processor 215 may be connected to the external network 230.

Similarly, in addition to the components that may be found in a typical WTRU, the WTRU 220 includes a processor 225, a receiver 226, a transmitter 227, and an antenna 228. The processor 225 is configured distribute beacon information in accordance with the present invention. The receiver 226 and the transmitter 227 are in communication with the processor 225. The antenna 228 is in communication with both the receiver 226 and the transmitter 227 to facilitate the transmission and reception of wireless data.

Figure 4:
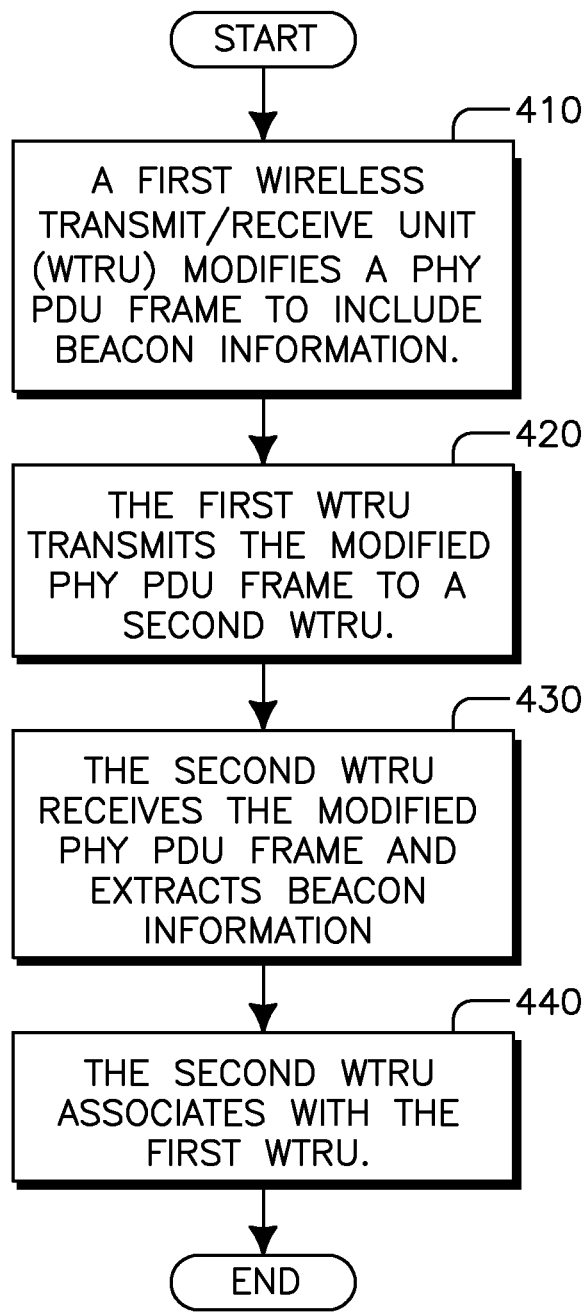
FIG. 4 is a flow diagram of a method for distributing beacon information, in accordance with the present invention.

FIG. 4 is a flow diagram of a method 400 for distributing beacon information, in accordance with the present invention. In a preferred embodiment of the present invention, the beacon information is distributed by the WTRU 210 to WTRUs 220 that wish to attach to the WTRU 210 and begin communicating with it. However, any wireless device may perform the method 400 of distributing beacon information.

In step 410, the WTRU 210 modifies a PHY PDU frame to include beacon information. The WTRU 210 includes variable information in a variable information frame 500 and fixed information in a fixed information frame 600.

FIG. 5 is a depiction of the variable information frame 500, containing variable elements of data in accordance with the present invention. The frame 500 includes an element ID field 510, a length field 520, and a service set identifier (SSID) field 530.

FIG. 6 is a depiction of the fixed information frame 600, containing fixed elements of data in accordance with the present invention. The frame 600 includes an element field 610 and time stamp field 620. In general, the variable information frame 500 and the fixed information frame 600 are somewhat similar. However, since the variable information frame 500 is variable in length, it includes the length field 520 to specify the length.

Table 1 below depicts each beacon information element. These information elements can be added to the PHY PDU frame 100 after the PLCP preamble field 117, and before or after the PLCP header 110. In a preferred embodiment, an additional field is added to the PLCP header 110 in the PHY PDU frame 100 that identifies the presence of the beacon information element and the information itself. This additional field may be a single bit that indicates the presence of the information element in the PHY PDU frame 100 and several bits indicating the actual type of information element (e.g. the "ID" in Table 1).

TABLE 1

| Information Element | ID | Number of Bytes needed |
|---|---|---|
| Time Stamp | 1 | 8 |
| Beacon Interval | 2 | 2 |
| SSID | 3 | Variable |
| Capability | 4 | 2 |
| Supported Rate | 5 | Variable |
| FH Parameter | 6 | 7 |
| CF parameter | 7 | 8 |
| DS Parameter | 8 | 1 |

Referring now to Table 1 above, information elements that are necessary or desirable for WTRU 220 association with WTRU 210 are typically transmitted in the beacon. However, these information elements may be attached to non-beacon control and data packets by the WTRU 210, in an embodiment of the present invention. Beacon information elements such as time stamp, beacon interval, service set identifier (SSID), capability, supported data rate, FH parameter, CF parameter, and DS parameter are generally transmitted separately in different management, control and data packets. Any other information elements added to the beacon are also transmitted as part of the packet.

Some of these elements are system parameters utilized by a STA that is attempting to associate with an AP. For example, the SSID identifies the identity of a basic service set (BSS). The FH parameter element provides synchronization parameters for STAs that utilize a frequency hopping (FH) physical layer, and the CF parameter element provides parameters for the point coordination function (CF) mode of operation. The DS parameter element provides information on channel number identification for STAs using a direct sequence spread spectrum (DSSS) physical layer.

Furthermore, the WTRU 210 may add these information elements either in the physical layer header, media access control (MAC) layer header or as part of the MAC payload. In a preferred embodiment of the present invention, a physical layer addition is preferable as it allows usage of lower data rates for these elements and can be received by WTRUs 220 farther away than the one addressed. For example the signal field 118 currently defined in the IEEE 802.11a standard may be expanded to include these information elements. Furthermore, any part of a single information element, a full information element, or several information elements may be transmitted in each packet. Each element may also be transmitted with its own cyclic redundancy check (CRC) or transmitted with the last information element containing the CRC of all the elements.

Accordingly, each packet contains information regarding its source (e.g. WTRU 210 or WTRU 220). This information may also be transmitted in the PLCP preamble field 117 or MAC header. For example, an indicator such as a bit or a field in the PLCP preamble field 117 or the MAC header may identify whether the transmitting WTRU is an AP or not. Accordingly, any WTRU monitoring the transmission medium for packets can know whether the packet is from an AP in case the WTRU wishes to associate with an AP. If the WTRU does wish to associate with an AP, the WTRU can then examine the beacon information.

The WTRU 210 then transmits the modified PHY PDU frame to the WTRU 220 (step 420), which receives the modified PHY PDU frame and extracts the beacon information from it (step 430). Apart from the beacon and probe, the WTRU 220 preferably gets each information element about the WTRU 210 from the packets. Once it has all the information, the WTRU 220 is able to associate with that WTRU 210 (step 440).

The present invention may be implemented in any type of wireless communication system, as desired. Additionally, the features of the present invention may implemented by software, may be incorporated into an integrated circuit (IC) or be configured in a circuit comprising a multitude of interconnecting components. Additionally, the processors 215/225 of the WTRU 210 and WTRU 220, respectively, may be configured to perform the steps of the method 400 described above. The processors 215/225 may also utilize the receivers 216/226, transmitters 217/227, and antennas 218/228, respectively, to facilitate wirelessly receiving and transmitting data.

The present invention may be implemented in any type of wireless communication system, as desired. By way of example, the present invention may be implemented in any type of 802 type system, OFDM-MIMO or any other type of wireless communication system, at the physical layer and data link layer. The present invention may also be implemented as software or hardware for radio resource management or a radio resource controller on an integrated circuit, such as an application specific integrated circuit (ASIC), multiple integrated circuits, logical programmable gate array (LPGA), multiple LPGAs, discrete components, or a combination of integrated circuit(s), LPGA(s), and discrete component(s).

While the present invention has been described in terms of various embodiments, other variations, which are within the scope of the invention, as outlined in the claims below, will be apparent to those skilled in the art. Further, although the features and elements of the present invention are described in the various embodiments in particular combinations, each feature or element can be used alone (without the other features and elements of the preferred embodiments) or in various combinations with or without other features and elements of the present invention.

What is claimed is:

1. A method for use in a first mobile station (STA) for distributing beacon information, the method comprising:
   modifying, at the first mobile STA, a physical layer protocol data unit (PHY PDU) frame having a physical layer convergence protocol (PLCP) preamble field and a PLCP header, by including at least one beacon information element between the PLCP preamble field and the PLCP header, including an indicator in the PLCP preamble field to indicate whether the modified PHY PDU frame is transmitted by a mobile STA or an access point (AP), and including a field in the PLCP header to identify presence and type of the at least one beacon information element; and
   transmitting the modified PHY PDU frame to a second mobile STA.

2. The method of claim 1 wherein the at least one beacon information element is included in a non-beacon control packet, a data packet or a management packet.

3. The method of claim 1 wherein the at least one beacon information element includes information relating to any one of the following: a time stamp, a beacon interval, a service set identifier (SSID) capability, a supported data rate, a frequency hopping (FH) parameter, a coordination function (CF) parameter, or a direct sequence (DS) parameter.

4. The method of claim 1 wherein the at least one beacon information element includes fixed beacon information and variable beacon information.

5. The method of claim 4 wherein the variable beacon information is included in a variable information frame.

6. The method of claim 5 wherein the variable information frame includes an element identifier (ID) field, a length field, and a service set identifier (SSID) field.

7. The method of claim 5 wherein the variable beacon information element includes a service set identifier (SSID) field and a supported rate.

8. The method of claim 4 wherein the fixed beacon information is included in a fixed information frame.

9. The method of claim 8 wherein the fixed information frame includes an element field and a time stamp field.

10. A mobile station (STA) configured to perform a method of distributing beacon information, the mobile STA comprising:
    a processor configured to modify a physical protocol data unit (PHY PDU) frame having a physical layer convergence protocol (PLCP) preamble field and a PLCP header, by including at least one beacon information element between the PLCP preamble field and the PLCP header, including an indicator in the PLCP preamble field to indicate whether the modified PHY PDU frame is transmitted by a mobile STA or an access point (AP), and including a field in the PLCP header to identify presence and type of the at least one beacon information element; and
    a transmitter configured to transmit the modified PHY PDU frame to at least one other mobile STA.

11. The mobile STA of claim 10 wherein the transmitter is further configured to transmit a plurality of beacon information elements in a single packet.

12. The mobile STA of claim 10 wherein the at least one beacon information element includes fixed beacon information and variable beacon information.

13. The mobile STA of claim 12 wherein the variable beacon information is included in a variable information frame.

14. The mobile STA of claim 12 wherein the fixed beacon information is included in a fixed information frame.

15. A wireless communication method comprising:
    modifying a physical layer protocol data unit (PHY PDU) frame by:
       including at least one beacon information element between a physical layer convergence protocol (PLCP) preamble field and a PLCP header of the PHY PDU frame;
       including an indicator in the PLCP preamble field to indicate whether the modified PHY PDU frame is transmitted by a mobile station (STA) or an access point (AP); and
       including a field in the PLCP header to identify presence and type of the at least one beacon information element; and
    transmitting the modified PHY PDU frame.

* * * * *